Dec. 20, 1966 C. F. ROBJOHNS 3,293,174
PLANT AND PROCESSES FOR THE TREATMENT OF EFFLUENT AND SEWAGE
Filed March 8, 1963
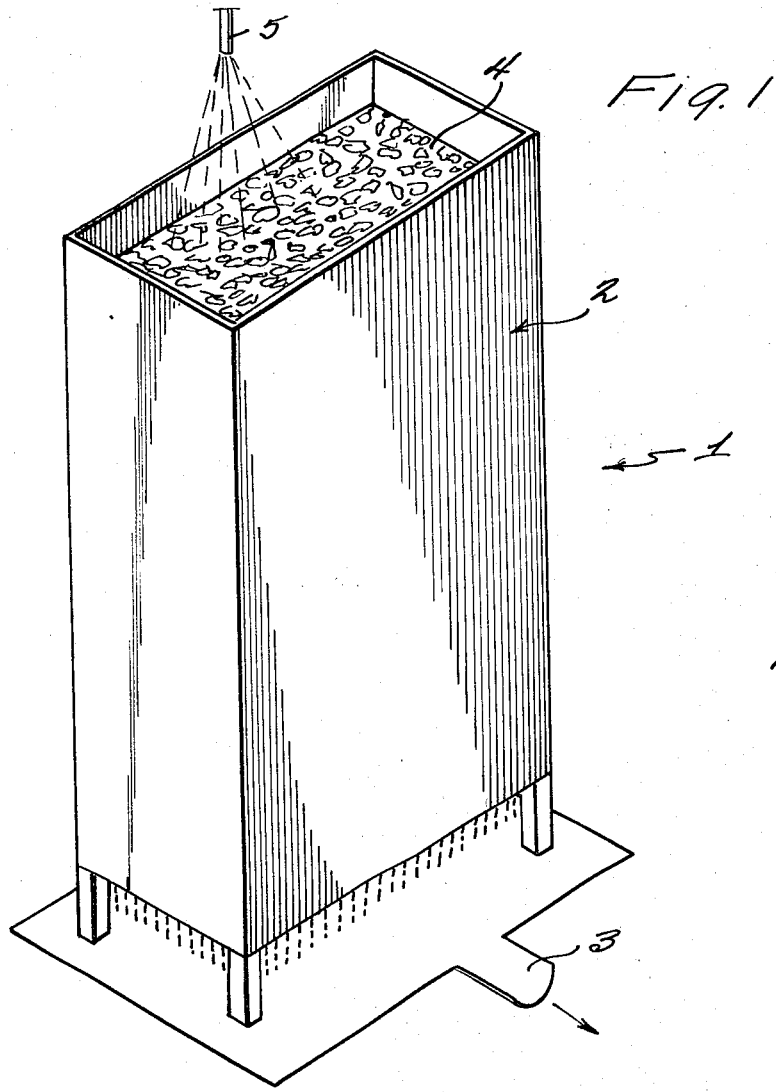
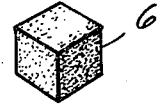
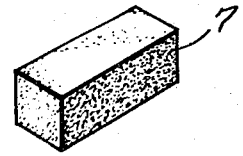
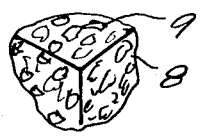
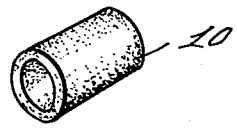
INVENTOR
CYRIL FRANCIS ROBJOHNS
BY
ATTORNEYS United States Patent Office 3,293,174
Patented Dec. 20, 1966

3,293,174
PLANT AND PROCESSES FOR THE TREATMENT OF EFFLUENT AND SEWAGE
Cyril Francis Robjohns, Brixham, England, assignor to Imperial Chemical Industries Limited, London, England, a corporation of Great Britain
Filed Mar. 8, 1963, Ser. No. 263,737
Claims priority, application Great Britain, Mar. 8, 1962, 9,034/62
8 Claims. (Cl. 210—17)

This invention relates to plant and processes for the treatment of liquid effluent and sewage hereinafter referred to as waste waters.

Hitherto waste waters have been treated by passing them through aerated percolating or trickling filters of various types, in which the organic content of the waste water is biologically oxidised.

In general these filters consist of retaining walls mounted over aeration and drainage channels and packed with a medium consisting of coke, clinker, gravel, slag or rock over the surface of which the waste water is passed to be purified by biologically-active aerobic micro-organisms located on the packing medium of the filter. The air necessary for the oxidation passes up from the aeration channels through the spaces between the pieces of the packing medium.

In other plants a packing of folded plastic sheets is provided in a tower and waste water passed down the tower. The spacing of the packing in these towers is more open than that in the more orthodox percolating or trickling filters but much less growth of micro-organisms takes place on the smooth plastic packing due to its limited effective surface area and the limited adhesion of micro-organisms to it.

In order to ensure a high rate of biological oxidation it is necessary to present the greatest possible area of biologically-active surface per unit volume of filter. At the same time the heavy growth of micro-organisms must not be easily detachable from the surfaces of the packing medium, otherwise it will block the main channels between the individual pieces of the packing.

We have now found that by employing inert expanded polymeric materials as packing medium improved aerated filter plants can be built and operated, the expanded polymeric material providing a basis for a greater effective area of biologically-active surface per unit volume of filter.

According to the present invention the packing medium in a biological waste water plant comprises pieces of inert expanded polymeric material.

The invention will be more clearly understood with reference to the accompanying drawing, wherein FIGURE 1 is a view of a trickling filter unit containing randomly arranged, discrete pieces of foamed inert polymeric material filter media. FIGURES 2, 3 and 5 are views of the trickling filter media. FIGURE 4 is an expanded view of a portion of the trickling filter media of FIGURE 3, illustrating the porous structure of the same.

Specifically, the trickling filter unit 1 of FIGURE 1 comprises trickling filter media support means 2, treated sewage discharge conduit 3, trickling filter media bed 4 and raw sewage conduit 5.

FIGURE 2 represents a square piece of inert expanded polymeric material filter media 6. FIGURE 3 illustrates a rectangular piece of inert expanded polymeric material filter media 7. FIGURE 4 represents an enlarged view of a corner 8 of the rectangular piece of inert expanded polymeric material 7 of FIGURE 3, showing in greater detail cavities 9. FIGURE 5 represents a tubular piece of inert expanded polymeric material filter media 10.

These pieces of inert expanded polymeric material may be of any desired shape, preferably those which present a large surface area, but, of course, must not be packed together so as to prevent free passage of air and liquid through the filter. Suitable shapes include spheres, ovoids, cubes, rings, tubes, cones, pyramids, lumbriciforms, crosses and various grids or meshes.

Suitable inert expanded polymeric materials for use in the manufacture of these pieces include polyurethane foams and, also in an expanded form, polyvinyl chloride, polystyrene, polyethylene, polypropylene, and polyamide resins. Certain polyester resins, acrylic resins and cellulose derivatives which are sufficiently inert in the particular process and are available in expanded form can also be used.

The polymeric materials can be produced in expanded form by any of the known techniques, but it is preferable to use polymeric materials expanded by techniques which produce within the material a large proportion of cavities. This structure greatly increases the surface area of the pieces and encourages growth of micro-organisms thereon.

The cavity size of the expanded material is preferably between 0.1 and 10 mm. across. When the cavities are in this size range we find that the biological activity is enhanced, particularly when the cavities are not uniform but vary widely in size. The larger cavities effectively increase the surface area of the pieces whilst the smaller cavities, by providing a rough surface, improve adhesion of the micro-organisms thereto. Particularly preferred pieces are rectangular solids, e.g. cubes or rods cut from polymeric material foamed in bulk. It is still further preferred that the material be a rigid foam. Softer foam may be used, though in this case the packing may require more support at intervals through its depth.

Alternatively, the pieces may be formed by sintering together particles, preferably foamed particles, of inert polymeric material. In this case the cavities provided by the interstices between the sintered particles present a good site for growth of micro-organisms.

When considering structures such as meshes, e.g. grids and rigid networks, the dimensions will to a large extent be governed by the size of the plant and the through-put and aeration required. Preferably the cavities provided by the openings of the meshes are within the size range referred to above and are just small enough to be bridged by the micro-organism growth. Thus there is provided a layer which is active on both opposed surfaces so increasing the effective biologically-active surface area of the piece. Again, the use of this type of expanded material, i.e. material having cavities or openings therein, also increases adheson of the micro-organsms to the supporting surface. Further, foamed material with its rougher surface may be used in the construction of the meshes to increase still further the adhesion of the micro-organisms. Preferably, the pieces of mesh have a hollow cross-section, e.g. tubes or rings.

The size of the pieces used as packing depends both on their shape and the type of plant in which they are to be used. Where they are cubes, ovoids, or spheres, a longest dimension of from 1" to 3" is preferred; where they are rods, or tubes, it is preferred that their length should not exceed 12".

Another advantage of our new packing medium is that since it contains cavities of one type or another it is of lower bulk density than unexpanded material; consequently the structural strength of a filter purification plant, and hence its cost, can be reduced. The weight reduction which can be achieved by employing our new packing medium also makes easier the construction of taller purification plants which can offer a substantial saving in ground area in congested industrial areas and other places in which land is at a premium.

Furthermore, since the plants provided by this invention can, economically, be made relatively tall, it is possible to carry out separate treatment operations in selected lengths of one tall structure. In this case the selected lengths may be packed with different pieces of expanded polymeric material.

For example, in one structure it will now be possible to accelerate the growth of particular organisms in selected parts of a structure and feed in particular wastes and nutrients at selected levels. Likewise, air or oxygen can be fed in and temperature can be regulated so permitting improved efficiency of the treatment plant. These tall treatment plants can be made up as simple towers or can be made from units adapted to be superimposed one above the other and loaded with our expanded packing medium to provide a tall, relatively light, waste water treatment plant.

The weight saving inherent in this invention will, of course, vary with the types of packing medium compared, but one example is as follows:

| 2,200 cubic yards of packing as— | Approximate Weight, Tons | |
|---|---|---|
| | Dry | Wet |
| 1″ Coke | 600 | 700 |
| 1½″ Polyurethane foam cubes (randomly arranged) | 15 | 110 |
| Gravel | 3,750 | 3,800 |

In view of the very substantial weight saving, efficient treatment towers can now be built having an acceptable loading on the tower floor.

For example, whereas a 30 ft. column of 1″ coke exerts a pressure of 930 lbs./sq. ft. (wet) and a 30 ft. column of gravel exerts a pressure of 4,300 lbs./sq. ft., a 30 ft. column of randomly arranged 1½″ cubes of polyurethane foam exerts a pressure of only 17 lbs./sq. ft (dry) and 190 lbs./sq. ft. (wet).

Using our preferred expanded materials, a higher biological efficiency can be obtained in comparison with filters employing coke and other known media as the packing medium.

This relatively high efficiency has been demonstrated by preparing two similar filters, one packed with 1″ coke in the normal way and the other with randomly arranged 1½″ cubes cut from polyurethane foam having cavity sizes between 0.2 mm. and 5.0 mm. As waste water, an effluent having a biological oxygen demand (B.O.D.) of 264 p.p.m. was treated in the two filters. It was found that the orthodox filter could treat the waste water at a rate of 212 gallons/cubic yard/day and the new filter, packed with the polyurethane foam, at least as effectively at a rate of 297 gallons/cubic yard/day.

The B.O.D. of the treated water from the tower was:

| | P.p.m. |
|---|---|
| Coke packed tower | 60 |
| Polyurethane foam packed tower | 16 |

In a further test carried out over a period of one year a coke filter fed with effluent of a B.O.D. of 168 p.p.m. reduced the B.O.D. to 28 p.p.m., whereas a filter of the same dimensions, but packed with cubes of cut polyurethane foam, reduced the B.O.D. of the effluent to 21 p.p.m. even when fed at a rate 50% greater than that of the coke filter.

What I claim is:
1. A trickling filter unit comprising in combination,
   (a) means to support a bed of trickling filter media;
   (b) said bed of trickling filter media comprising a mass of randomly arranged, discrete pieces of foamed inert polymeric material, and
   (c) means operatively associated with said means to support said media to pass a liquid and a gas through said bed.
2. The combination as claimed in claim 1 in which the pieces are bulk foamed polymeric material-cut rectangular solids.
3. The combination as claimed in claim 1 in which the foamed polymeric material defines cavities of a size from 0.1 to 10 mm. across.
4. The combination as claimed in claim 1 wherein the foamed inert polymeric material is selected from the group consisting of polyurethane, polyvinyl chloride, polystyrene, polyethylene, polypropylene, polyamide, polyester, acrylic and cellulosic derivative polymers.
5. A process for treatment of liquid effluent and sewage comprising passing liquid effluent through a bed of randomly arranged discrete pieces of inert foamed polymeric material packing which contains on the surface thereof biologically active aerobic microorganisms and passing air up through the bed, whereby the organic content of the liquid effluent is biologically oxidized.
6. The process of claim 5 wherein the inert foamed polymeric material is selected from the group consisting of polyurethane, polyvinyl chloride, polystyrene, polyethylene, polypropylene, polyamide, polyester, acrylic and cellulosic derivative polymers.
7. The process of claim 5 wherein the pieces are of rectangular shape.
8. The process of claim 5 wherein the inert foamed polymeric material is a foamed polymeric material defining cavities therein of a diameter of 0.1 to 10 mm.

References Cited by the Examiner

UNITED STATES PATENTS

| 2,071,591 | 2/1937 | Tholin | 210—17 |
| 2,188,162 | 1/1940 | Schulhoff | 210—150 X |
| 3,113,102 | 12/1963 | Schulze | 210—150 |
| 3,227,429 | 1/1966 | Renzi | 210—150 X |

FOREIGN PATENTS 858,127  1/1961  Great Britain.

OTHER REFERENCES

Industrial Wastes, vol. 5, No. 4, August 1960, pages 71–77.

REUBEN FRIEDMAN, *Primary Examiner.*

D. M. RIESS, *Assistant Examiner.*